(12) United States Patent
Fukase et al.

(10) Patent No.: US 11,209,579 B2
(45) Date of Patent: Dec. 28, 2021

(54) CROSS DICHROIC PRISM, IMAGE DISPLAY MODULE, AND IMAGE DISPLAY DEVICE

(71) Applicant: SEIKO EPSON CORPORATION, Tokyo (JP)

(72) Inventors: Akio Fukase, Chino (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 254 days.

(21) Appl. No.: 16/459,696

(22) Filed: Jul. 2, 2019

(65) Prior Publication Data
US 2020/0012021 A1 Jan. 9, 2020

(30) Foreign Application Priority Data
Jul. 3, 2018 (JP) .............................. JP2018-126511

(51) Int. Cl.
*G02B 5/04* (2006.01)
*G02B 27/01* (2006.01)

(52) U.S. Cl.
CPC ......... *G02B 5/045* (2013.01); *G02B 27/0172* (2013.01); *G02B 2027/0178* (2013.01)

(58) Field of Classification Search
CPC .. G03B 21/005; G03B 21/006; G03B 21/008; G03B 21/28; G03B 21/145; G03B 21/208; G03B 21/2013; G03B 21/2033; G03B 21/2066; G02B 27/0172; G02B 27/62; G02B 27/145; G02B 27/149; G02B 27/1046; G02B 27/1073; G02B 27/1076; G02B 5/04; G02B 5/045; G02B 5/0816; G02B 5/0825; G02B 5/0833; G02B 5/0841; G02B 5/0858; G02B 5/122
See application file for complete search history.

(56) References Cited

U.S. PATENT DOCUMENTS

| | | | |
|---|---|---|---|
| 6,342,971 B1 * | 1/2002 | Hashizume | G02B 5/04 349/5 |
| 7,347,561 B2 * | 3/2008 | Pentico | H04N 9/3105 348/E9.027 |
| 2015/0160462 A1 * | 6/2015 | Takahara | G03B 33/12 359/634 |
| 2015/0277125 A1 * | 10/2015 | Hirano | G02B 6/0093 359/633 |
| 2018/0335629 A1 * | 11/2018 | Cheng | G02B 5/3016 |

FOREIGN PATENT DOCUMENTS

| JP | H01-302385 A | 12/1989 |
|---|---|---|
| JP | 2010-060770 A | 3/2010 |

* cited by examiner

*Primary Examiner* — Sultan Chowdhury
(74) *Attorney, Agent, or Firm* — Oliff PLC

(57) ABSTRACT

The cross dichroic prism according to the present disclosure includes four prisms and two dichroic mirrors. Each of the four prisms has a triangle-prism shape. The four prisms are arranged to form a quadrangular prism as a whole in a manner such that the ridge line portions are located close to each other, a first plane of one prism faces a second plane of another prism, and a third plane faces outward. Each of the two dichroic mirrors is constituted of a dielectric multilayer film provided between the first plane of one prism and the second plane of another prism. The outermost layer of a dielectric layer constituting the dielectric multilayer film is provided in contact with each of the first plane of the one prism and the second plane of the other prism.

10 Claims, 9 Drawing Sheets

CROSS DICHROIC PRISM, IMAGE DISPLAY MODULE, AND IMAGE DISPLAY DEVICE

The present application is based on, and claims priority from JP-A-2018-126511, filed Jul. 3, 2018, the disclosure of which is hereby incorporated by reference herein in its entirety.

BACKGROUND

1. Technical Field

The present disclosure relates to a cross dichroic prism, an image display module, and an image display device.

2. Related Art

In image display devices such as a head-mounted display and a projector, a cross dichroic prism has been known, the cross dichroic prism synthesizing a plurality of color lights with colors differing from each other. JP-A-2010-60770 described below discloses a prism, which includes a first optical member and a second optical member, each of which has a triangle-prism shape and also includes a wavelength selecting film provided between the first optical member and the second optical member. In the disclosed prism, the wavelength selecting film is constituted of a dielectric multilayer film containing a plasma-polymerized film. JP-A-2010-60770 describes that the prism is used in a liquid crystal projector.

As described in JP-A-2010-60770, when a cross dichroic prism is used as a color synthesizing element for the liquid crystal projector, liquid crystal light valves, which modulates a corresponding color light of red light (R), green light (G), and blue light (B), are each disposed on a corresponding surface of three surfaces of the cross dichroic prism. Three color lights emitted from the liquid crystal light valves are synthesized in the cross dichroic prism and are emitted toward a projection lens. In this case, a polarization plate is typically disposed such that p-polarized light is emitted from the liquid crystal light valve for green light, and s-polarized light is emitted from the liquid crystal light valve for red light and the liquid crystal light valve for blue light.

The cross dichroic prism includes a first dichroic mirror and a second dichroic mirror provided to intersect each other. The green light, which is p-polarized light, passes through both of these dichroic mirrors and is emitted. The red light, which is s-polarized light, passes through the first dichroic mirror, is reflected on the second dichroic mirror, and is emitted. The blue light, which is s-polarized light, passes through the second dichroic mirror, is reflected on the first dichroic mirror, and is emitted. In this manner, three color lights are synthesized.

On the other hand, unlike the case of the liquid crystal element, the emitted light obtained from an organic electro luminescence (EL) element does not have a polarization property. This is because, in the case of the organic EL element, the emitted light is generated from organic molecules arranged randomly in an organic thin film and hence does not have the polarization property that is typically provided in the case of the liquid crystal element. If, in a display panel (organic EL panel) made of organic EL elements, three panels that emit red light, blue light, and green light respectively are prepared and these three color light rays are synthesized using the cross dichroic prism, a configuration like this is applicable to a display device using the organic EL panel.

However, as the light from the organic EL panel does not have the polarization property, the cross dichroic prism used in combination with the organic EL panel needs to be configured such that both of the p-polarized light and the s-polarized light are reflected or made pass through depending on wavelengths, rather than either one of the p-polarized light and the s-polarized light being reflected and the other one being made pass through.

In the case where such a dichroic mirror is produced, the number of layers of a dielectric multilayer film constituting the dichroic mirror increases, as compared with a known cross dichroic prism configured to reflect either one of the s-polarized light and the p-polarized light and make the other pass through. This increases stress on the dielectric multilayer film, which may cause troubles such as distortion of a triangle-prism-shaped prism serving as a base, breakage of the dielectric multilayer film itself, and the like. This results in a problem in that the quality of display of the display device using this cross dichroic prism deteriorates.

SUMMARY

In order to solve the problem described above, a cross dichroic prism includes four prisms, and two dichroic mirrors, in which each of the four prisms has a triangle-prism shape and includes a first plane, a second plane, and a third plane, the first plane and the second plane intersecting each other to constitute a ridge line portion, the third plane forming an acute angle together with each of the first plane and the second plane, the four prisms are arranged in combination such that the ridge line portions of the four prisms face each other, the first plane of one prism of the four prisms faces the second plane of another prism of the four prisms, and the third plane faces outward, each of the two dichroic mirrors is constituted of a dielectric multilayer film provided between the first plane of the one prism and the second plane of the other prism, and an outermost dielectric layer constituting the dielectric multilayer film is provided in contact with each of the first plane of the one prism and the second plane of the other prism.

In the cross dichroic prism according to one aspect of the present disclosure, each of the two dichroic mirrors may not have a polarization-separation property.

In the cross dichroic prism according to one aspect of the present disclosure, a first dielectric multilayer film, formed of a plurality of first dielectric layers constituting a part of the dielectric multilayer film, may be provided on the first plane of the one prism, a second dielectric multilayer film, formed of a plurality of second dielectric layers constituting another part of the dielectric multilayer film, may be provided on the second plane of the other prism, and an adhesive layer may be provided between the first dielectric multilayer film and the second dielectric multilayer film.

In the cross dichroic prism according to one aspect of the present disclosure, the film thickness of the adhesive layer may be greater than 1 µm.

In the cross dichroic prism according to one aspect of the present disclosure, the adhesive layer may function as a dielectric layer constituting the dielectric multilayer film.

In the cross dichroic prism according to one aspect of the present disclosure, the thickness of the adhesive layer may be not less than 0.01 µm and not more than 1 µm.

In the cross dichroic prism according to one aspect of the present disclosure, each of the plurality of dielectric layers may be constituted of an inorganic film, and the adhesive layer may be constituted of an organic film.

An image display module according to one aspect of the present disclosure includes the cross dichroic prism according to one aspect of the present disclosure, and at least two image display panels provided to face at least two of the third planes among four of the third planes of the cross dichroic prisms.

In the image display module according to one aspect of the present disclosure, each of the at least two image display panels may emit imaging light that does not have a polarization property.

An image display device according to one aspect of the present disclosure includes the image display module according to one aspect of the present disclosure.

DESCRIPTION OF EXEMPLARY EMBODIMENTS

First Exemplary Embodiment

Below, a first exemplary embodiment according to the present disclosure will be described with reference to FIGS. 1, 2, and 3A to 3C.

Figure 1:
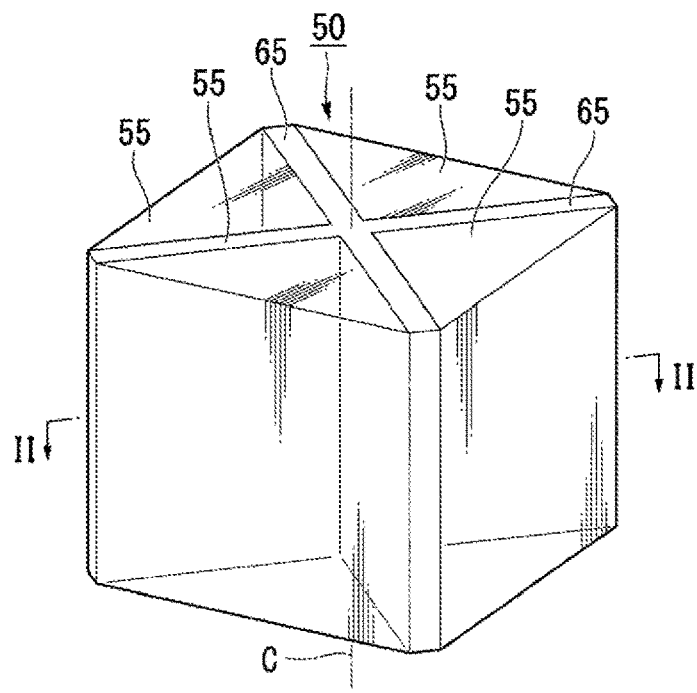
FIG. 1 is a perspective view illustrating a cross dichroic prism according to a first exemplary embodiment.
Figure 2:
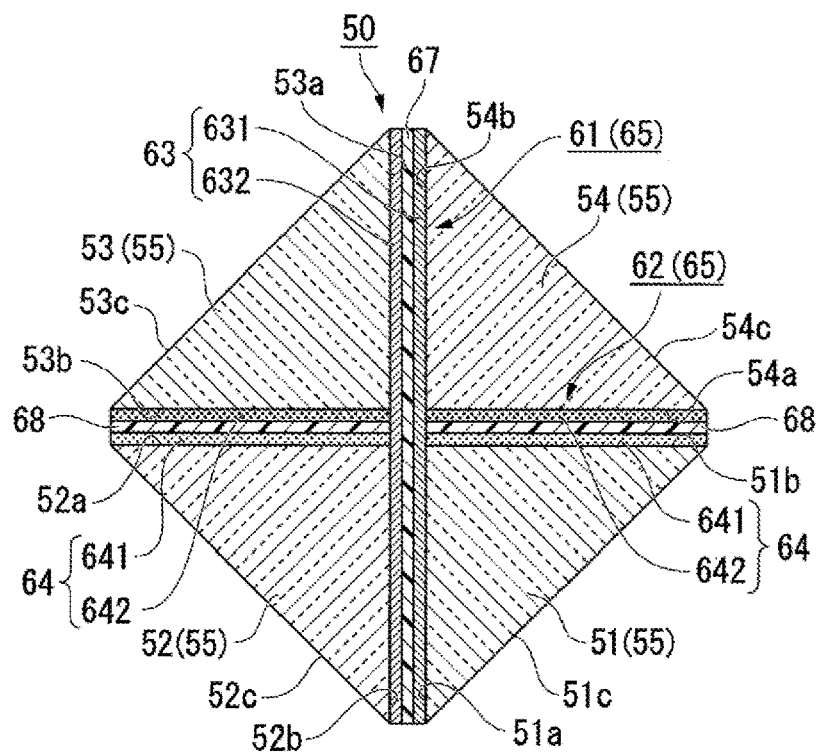
FIG. 2 is a sectional view taken along the line II-II in FIG. 1.

FIG. 1 is a perspective view illustrating a cross dichroic prism 50 according to the first exemplary embodiment. FIG. 2 is a cross-sectional view taken along the line II-II in FIG. 1.

Note that, in the drawings, the dimensions of some components may be scaled differently for the ease of understanding for the components.

The cross dichroic prism 50 according to the first exemplary embodiment is used, for example, to synthesize a plurality of imaging lights from a plurality of image display panels such as organic EL panels that emit an imaging light that does not have a polarization property.

As illustrated in FIGS. 1 and 2, the cross dichroic prism 50 includes four prisms 55 and two dichroic mirrors 65.

For the purpose of explanation, in FIG. 2, a prism illustrated in the lower right is referred to as a first prism 51. After this, in a clockwise direction, a prism illustrated in the lower left is referred to as a second prism 52; a prism illustrated in the upper left is referred to as a third prism 53; and a prism illustrated in the upper right is referred to as a fourth prism 54. In addition, they may be simply referred to as the prism 55 when the four prisms do not particularly need to be called separately.

In FIG. 2, a dichroic mirror extending in the vertical direction is referred to as a first dichroic mirror 61, and a dichroic mirror extending in the horizontal direction is referred to as a second dichroic mirror 62. In addition, they may be simply referred to as the dichroic mirror 65 when the two dichroic mirrors do not particularly need to be called separately. The imaginary axis passing through the center of the intersecting portion between the first dichroic mirror 61 and the second dichroic mirror 62 is referred to as a central axis C of the cross dichroic prism 50.

The first prism 51, the second prism 52, the third prism 53, and the fourth prism 54 each have the same shape and the same dimension and are made of the same material. The prism 55 has a triangle-prism shape. The cross-sectional shape of the prism 55 taken along a plane perpendicular to the central axis C has an isosceles right triangle shape. Of the three side surfaces of the triangle prism that form the outer shape of the prism 55, two side surfaces that are located adjacent to each other at an angle of 90 degrees are referred to as a first plane 51a, 52a, 53a, and 54a and a second plane 51b, 52b, 53b, and 54b respectively. The first plane 51a, 52a, 53a, and 54a and the second plane 51b, 52b, 53b, and 54b intersect each other and constitute a ridge line portion of the prism 55 that has an angle of 90 degrees. In addition, one side surface that forms an acute angle together with each of the first plane 51a, 52a, 53a, and 54a and each of the second plane 51b, 52b, 53b, and 54b is referred to as a third plane 51c, 52c, 53c and 54c.

The four prisms 55 are arranged to form a quadrangular prism as a whole in a manner such that the ridge line portions of the four prisms 55 face the central axis C and are located close to each other, the respective first planes 51a, 52a, 53a, and 54a of the four prisms 55 and the respective second planes 51b, 52b, 53b, and 54b of the four prisms 55 face one another; and the third plane 51c, 52c, 53c and 54c face outward.

In the present exemplary embodiment, the third plane 51c, 52c, and 53c of each of the first prism 51, the second prism 52, and the third prism 53 serves as a light incident surface that allows light to enter the cross dichroic prism 50, and the third plane 54c of the fourth prism 54 serves as a light exit plane that allows light to be emitted from the cross dichroic prism 50. The prism 55 is made, for example, of an optical glass such as BK7.

The first dichroic mirror 61 is constituted of a dielectric multilayer film 63 provided continuously between the first plane 51a of the first prism 51 and the second plane 52b of the second prism 52 and between the second plane 54b of the fourth prism 54 and the first plane 53a of the third prism 53. The first dichroic mirror 61 has a configuration in which a plurality of dielectric layers having refractive indices different from each other are alternately layered. For the material of the dielectric layer, an inorganic film such as MgF$_2$, TiO$_2$, Al$_2$O$_3$, HfO$_2$, Ta$_2$O$_5$, Nb$_2$O$_5$, and SiO$_2$ is used, for example. The film thickness of one layer of the dielectric layer is not less than 0.01 μm and not more than 1 μm. The dielectric multilayer film 63 is constituted of dielectric layers of approximately 100 layers as a whole. Note that, in FIG. 2, illustration of individual dielectric layers is omitted as the number of layers of the dielectric layers that form the dielectric multilayer film 63 is large.

Furthermore, the first dichroic mirror 61 includes a first dielectric multilayer film 631, an adhesive layer 67, and a second dielectric multilayer film 632. The first dielectric multilayer film 631 is provided across the first plane 51*a* of the first prism 51 and the second plane 54*b* of the fourth prism 54. The first dielectric multilayer film 631 includes a plurality of first dielectric layers serving as a part of the dielectric multilayer film 63 constituting the first dichroic mirror 61. The first dielectric multilayer film 631 is constituted of first dielectric layers of approximately 50 layers, which are half of the number of layers of the entire dielectric multilayer film 63.

The second dielectric multilayer film 632 is provided across the second plane 52*b* of the second prism 52 and the first plane 53*a* of the third prism 53. The second dielectric multilayer film 632 includes a plurality of second dielectric layers serving as another part of the dielectric multilayer film 63 constituting the first dichroic mirror 61. The second dielectric multilayer film 632 is constituted of second dielectric layers of approximately 50 layers, which are half of the number of layers of the entire dielectric multilayer film 63.

The adhesive layer 67 lies between the first dielectric multilayer film 631 and the second dielectric multilayer film 632 and joins the first dielectric multilayer film 631 and the second dielectric multilayer film 632 together. For the material of the adhesive layer 67, an acrylic resin-based adhesive such as Photobond (trade name, manufactured by Sunrise Co., Ltd.), which is one of the UV curable adhesives, Optokleb (trade name, manufactured by MS ADELL Co., Ltd.), which is one of the optical adhesives, an epoxy resin-based adhesive, or the like is used. The film thickness of the adhesive layer 67 is thicker than 1 μm.

The first dielectric multilayer film 631 is formed directly on the first plane 51*a* of the first prism 51 and the second plane 54*b* of the fourth prism 54, without intervening any adhesives. Similarly, the second dielectric multilayer film 632 is formed directly on the second plane 52*b* of the second prism 52 and the first plane 53*a* of the third prism 53, without intervening any adhesives. Thus, the outermost layer of the dielectric layers constituting the dielectric multilayer film 63 is provided in contact with the first plane 51*a* of the first prism 51 and the second plane 54*b* of the fourth prism 54. In addition, the outermost layer of the dielectric layers constituting the dielectric multilayer film 63 is provided in contact with the second plane 52*b* of the second prism 52 and the first plane 53*a* of the third prism 53.

The first dichroic mirror 61 does not have any polarization-separation property and has a property that allows light having a wavelength falling in a blue color range to be reflected and allows light having wavelength falling in a green color range and a red color range to pass through. In other words, the blue color light entering the cross dichroic prism 50 is reflected on the first dichroic mirror 61 regardless of the polarization state, and the green color light and the red color light entering the cross dichroic prism 50 pass through the first dichroic mirror 61 regardless of the polarization state.

The second dichroic mirror 62 is constituted of a dielectric multilayer film 64 provided between the second plane 51*b* of the first prism 51 and the first plane 54*a* of the fourth prism 54 and between the first plane 52*a* of the second prism 52 and the second plane 53*b* of the third prism 53. The second dichroic mirror 62 has a configuration in which a plurality of dielectric layers having refractive indices different from each other are alternately layered. The material, the film thickness, and the number of layers of the dielectric layer are similar to those of the dielectric layer of the first dichroic mirror 61. However, unlike the first dichroic mirror 61, the second dichroic mirror 62 is separated at an intersecting portion between the first dichroic mirror 61 and the second dichroic mirror 62.

Furthermore, the second dichroic mirror 62 includes a first dielectric multilayer film 641, an adhesive layer 68, and a second dielectric multilayer film 642. The first dielectric multilayer film 641 is provided on the second plane 51*b* of the first prism 51 and the first plane 52*a* of the second prism 52. The first dielectric multilayer film 641 is constituted of a plurality of first dielectric layers serving as a part of the dielectric multilayer film 64 constituting the second dichroic mirror 62. The first dielectric multilayer film 641 is constituted of first dielectric layers of approximately 50 layers, which are half of the number of layers of the entire dielectric multilayer film 64.

The second dielectric multilayer film 642 is provided on the first plane 54*a* of the fourth prism 54 and the second plane 53*b* of the third prism 53. The second dielectric multilayer film 642 is constituted of a plurality of second dielectric layers serving as another part of the dielectric multilayer film 64 constituting the second dichroic mirror 62. The second dielectric multilayer film 642 is constituted of second dielectric layers of approximately 50 layers, which are half of the number of layers of the entire dielectric multilayer film 64.

The adhesive layer 68 lies between the first dielectric multilayer film 641 and the second dielectric multilayer film 642 and joins the first dielectric multilayer film 641 and the second dielectric multilayer film 642 together. The constituent material and the film thickness of the adhesive layer 68 are similar to those of the adhesive layer 67 of the first dichroic mirror 61.

The first dielectric multilayer film 641 is formed directly on the second plane 51*b* of the first prism 51 and the first plane 52*a* of the second prism 52, without intervening any adhesives. Similarly, the second dielectric multilayer film 642 is formed directly on the first plane 54*a* of the fourth prism 54 and the second plane 53*b* of the third prism 53, without intervening any adhesives. Thus, the outermost layer of the dielectric layers constituting the dielectric multilayer film 64 is provided in contact with the second plane 51*b* of the first prism 51 and the first plane 52*a* of the second prism 52. In addition, the outermost layer of the dielectric layer constituting the dielectric multilayer film 64 is provided in contact with the first plane 54*a* of the fourth prism 54 and the second plane 53*b* of the third prism 53.

The second dichroic mirror 62 does not have a polarization-separation property and has a property that allows light having a wavelength falling in a red color range to be reflected and allows light having wavelengths falling in a blue color range and a green color range to pass through. In other words, the red color light entering the cross dichroic prism 50 is reflected on the second dichroic mirror 62 regardless of the polarization state, and the blue color light and the green color light entering the cross dichroic prism 50 pass through the second dichroic mirror 62, regardless of the polarization state.

As described above, each of the plurality of dielectric layers constituting each of the dichroic mirrors 61 and 62 is constituted of an inorganic film. The adhesive layers 67 and 68 are constituted of an organic film. In addition, each of the first dichroic mirror 61 and the second dichroic mirror 62 does not have a polarization property.

Note that the description above has given an example in which the first dichroic mirror 61 and the second dichroic mirror 62 each have a configuration in which both the first dielectric multilayer film 631 and 641 and the second dielectric multilayer film 632 and 642 are constituted of dielectric layers of approximately 50 layers. However, the number of layers of the first dielectric multilayer film 631 and 641 does not need to be equal to the number of layers of the second dielectric multilayer film 632 and 642. For example, it may be possible to employ a configuration in which the first dielectric multilayer film 631 and 641 is constituted of dielectric layers of 40 layers, and the second dielectric multilayer film 632 and 642 is constituted of dielectric layers of 60 layers.

However, in order to maximize the effect of the present exemplary embodiment of reducing the distortion of the prism 55 and breakage of the dielectric multilayer film 63 and 64 described later, it is desirable that the number of layers of the first dielectric multilayer film 631 and 641 is equal to the number of layers of the second dielectric multilayer film 632 and 642. In addition, the constituent material, the film thickness, and the like of each dielectric layer of the first dielectric multilayer film 631 and 641 and the second dielectric multilayer film 632 and 642 may be equal to each other or may differ from each other.

Below, a method for manufacturing the cross dichroic prism 50 having the configuration described above will be described.

Figure 3A:
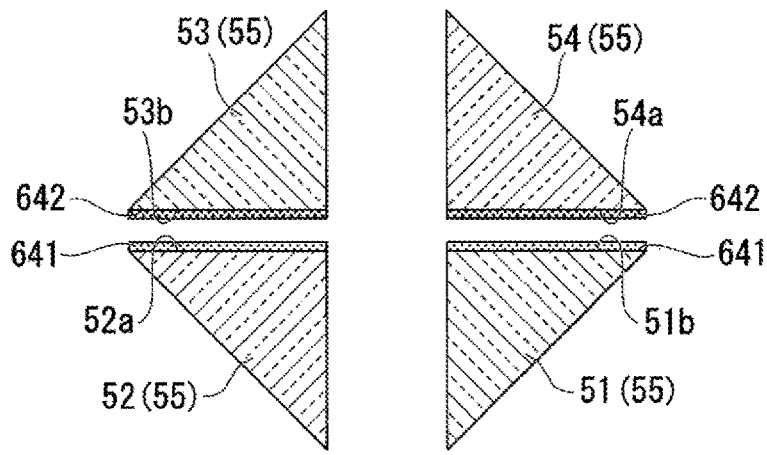
FIG. 3A is a cross-sectional view illustrating one step of a manufacturing process for the cross dichroic prism according to the first exemplary embodiment.
Figure 3B:
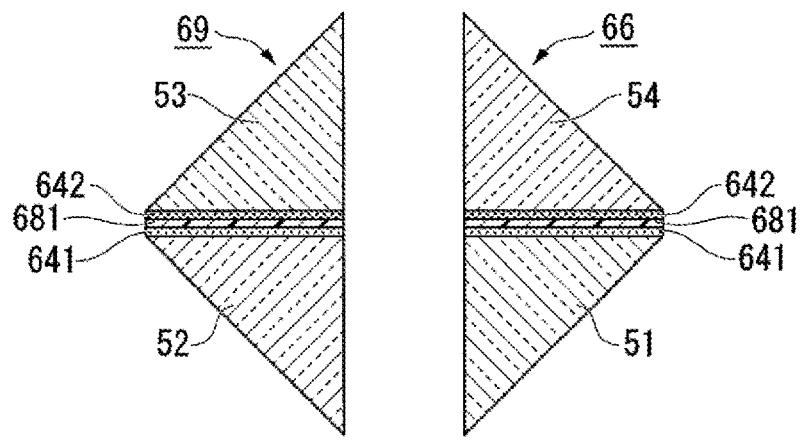
FIG. 3B is a cross-sectional view illustrating a next step after the step in FIG. 3A.
Figure 3C:
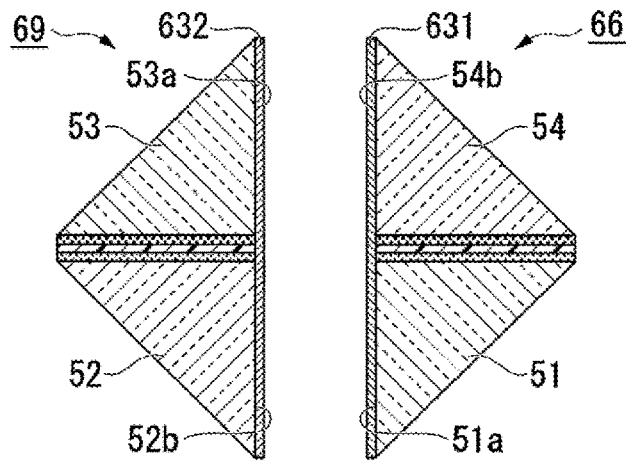
FIG. 3C is a cross-sectional view illustrating a next step after the step in FIG. 3B.

FIG. 3A is a cross-sectional view illustrating one step of a manufacturing process for the cross dichroic prism 50 according to the first exemplary embodiment. FIG. 3B is a cross-sectional view illustrating a next step after the step in FIG. 3A. FIG. 3C is a cross-sectional view illustrating a next step after the step in FIG. 3B.

First, the four prisms 55 serving as the first to fourth prisms and having a triangle-prism shape are prepared.

Next, as illustrated in FIG. 3A, dielectric layers of approximately 50 layers are film-formed on the second plane 51b of the first prism 51 and the first plane 52a of the second prism 52 using a film formation method such as vapor deposition and spattering, to form the first dielectric multilayer film 641 constituting the second dichroic mirror 62. Similarly, dielectric layers of approximately 50 layers are film-formed on the first plane 54a of the fourth prism 54 and the second plane 53b of the third prism 53 using a film formation method such as vapor deposition and spattering, to form the second dielectric multilayer film 642 constituting the second dichroic mirror 62.

Next, as illustrated in FIG. 3B, an organic-based adhesive 681 is applied to the surface of the first dielectric multilayer film 641 or the second dielectric multilayer film 642. Then, the first prism 51 on which the first dielectric multilayer film 641 is formed and the fourth prism 54 on which the second dielectric multilayer film 642 is formed are joined together by intervening the organic-based adhesive 681. The organic-based adhesive 681 is cured to create a first prism assembly 66. Using a similar method, the second prism 52 on which the first dielectric multilayer film 641 is formed and the third prism 53 on which the second dielectric multilayer film 642 is formed are joined together to create a second prism assembly 69.

Next, as illustrated in FIG. 3C, in the first prism assembly 66, dielectric layers of approximately 50 layers are film-formed on the first plane 51a of the first prism 51 and the second plane 54b of the fourth prism 54 using a film formation method such as vapor deposition and spattering, to form the first dielectric multilayer film 631 constituting the first dichroic mirror 61. Similarly, in the second prism assembly 69, dielectric layers of approximately 50 layers are film-formed on the second plane 52b of the second prism 52 and the first plane 53a of the third prism 53 using a film formation method such as vapor deposition and spattering, to form the second dielectric multilayer film 632 constituting the first dichroic mirror 61.

Next, an organic-based adhesive is applied to the surface of the first dielectric multilayer film 631 or the second dielectric multilayer film 632. Then, the first prism assembly 66 on which the first dielectric multilayer film 631 is formed and the second prism assembly 69 on which the second dielectric multilayer film 632 is formed are joined together by intervening the organic-based adhesive, and the organic-based adhesive is cured.

Through these steps, the cross dichroic prism 50 according to the present exemplary embodiment illustrated in FIG. 2 is completed.

Here, a cross dichroic prism according to a comparative example will be described.

The cross dichroic prism according to the comparative example is used in combination with a display panel such as a liquid crystal panel that emits a specific linearly polarized light, and the cross dichroic prism has a typical configuration as a cross dichroic prism that synthesizes a plurality of color lights emitted from a plurality of display panels.

Figure 9:
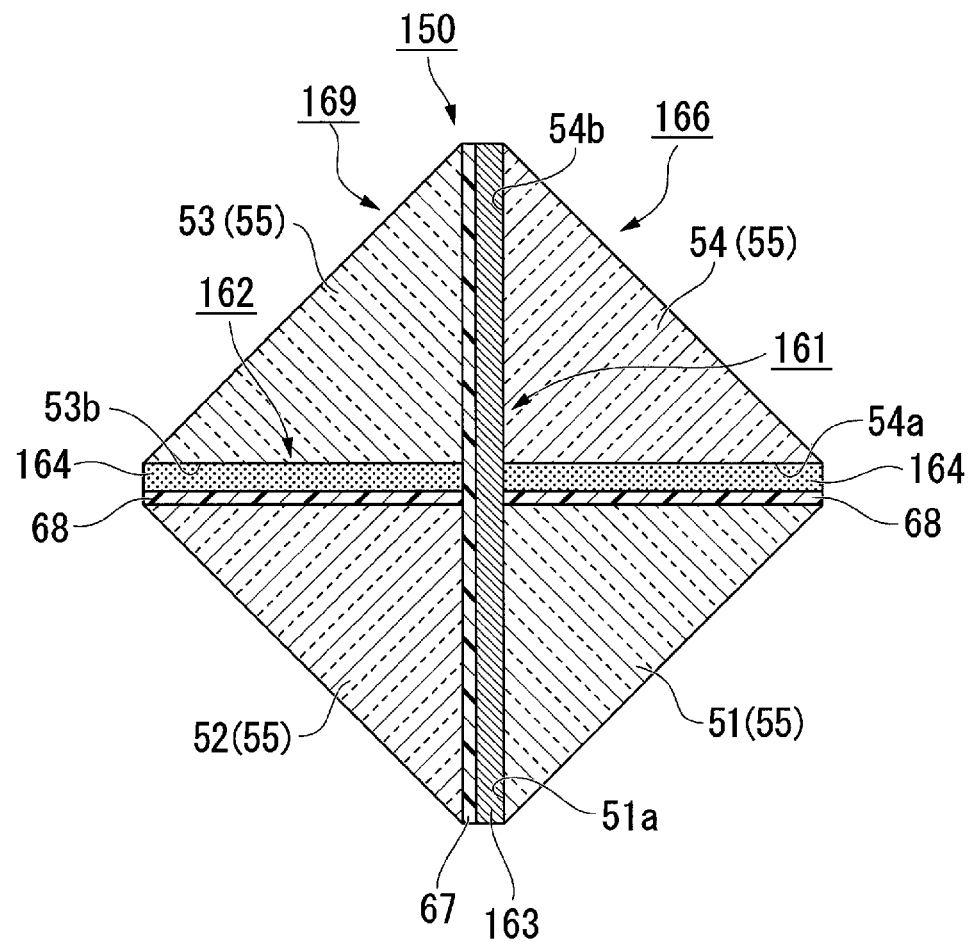
FIG. 9 is a cross-sectional view illustrating a cross dichroic prism according to a comparative example.

FIG. 9 is a cross-sectional view illustrating a cross dichroic prism 150 according to the comparative example.

In FIG. 9, the constituent elements common to those in FIG. 2 used in the present exemplary embodiment are denoted with the same reference characters, and the description thereof will not be repeated.

As illustrated in FIG. 9, the cross dichroic prism 150 according to the comparative example includes the four prisms 55 and two dichroic mirrors 161 and 162. The first dichroic mirror 161 includes a dielectric multilayer film 163 provided on the first plane 51a of the first prism 51 and the second plane 54b of the fourth prism 54. The second dichroic mirror 162 includes a dielectric multilayer film 164 provided on the second plane 53b of the third prism 53 and the first plane 54a of the fourth prism 54.

The fourth prism 54 on which the dielectric multilayer film 164 is formed and the first prism 51 are joined together by intervening the adhesive layer 68. The third prism 53 on which the dielectric multilayer film 164 is formed and the second prism 52 are joined together by intervening the adhesive layer 68. A first prism assembly 166 obtained by joining the fourth prism 54 and the first prism 51 together and a second prism assembly 169 obtained by joining the third prism 53 and the second prism 52 together are joined together by intervening the adhesive layer 67.

Below, a method for manufacturing the cross dichroic prism 150 according to the comparative example will be described.

Figure 10A:
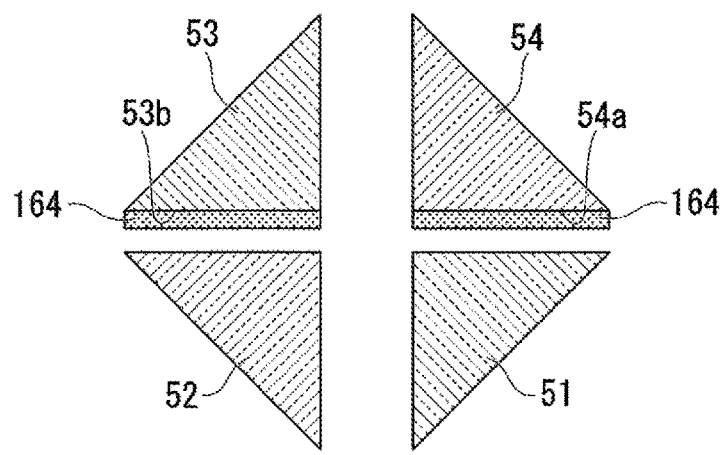
FIG. 10A is a cross-sectional view illustrating one step of a manufacturing process for the cross dichroic prism according to the comparative example.
Figure 10B:
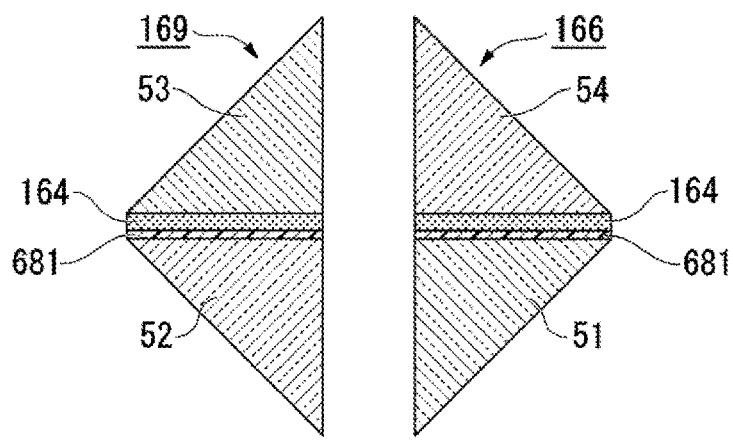
FIG. 10B is a cross-sectional view illustrating a next step after the step in FIG. 10A.
Figure 10C:
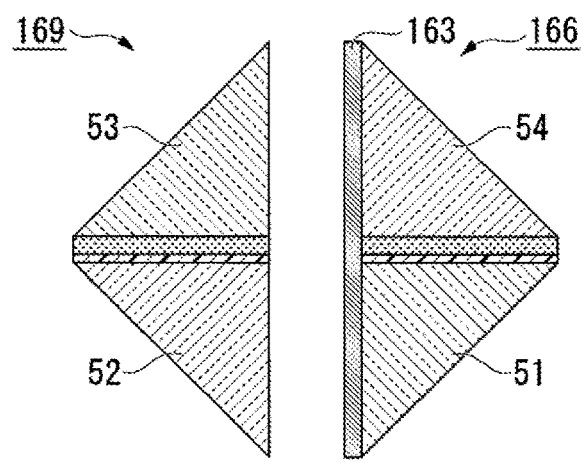
FIG. 10C is a cross-sectional view illustrating a next step after the step in FIG. 10B.

FIG. 10A is a cross-sectional view illustrating one step of a manufacturing process for the cross dichroic prism 150 according to the comparative example. FIG. 10B is a cross-sectional view illustrating a next step after the step in FIG. 10A. FIG. 10C is a cross-sectional view illustrating a next step after the step in FIG. 10B.

As illustrated in FIG. 10A, a plurality of dielectric layers are film-formed on the first plane 54a of the fourth prism 54 to form the dielectric multilayer film 164 constituting the second dichroic mirror 162. Similarly, a plurality of dielectric layers are film-formed on the second plane 53b of the third prism 53 to form the dielectric multilayer film 164 constituting the second dichroic mirror 162.

Next, as illustrated in FIG. 10B, the fourth prism 54 on which the dielectric multilayer film 164 is formed and the first prism 51 are joined together by intervening the organic-based adhesive 681 to create the first prism assembly 166. Similarly, the third prism 53 on which the dielectric multilayer film 164 is formed and the second prism 52 are joined together by intervening the organic-based adhesive 681 to create the second prism assembly 169.

Next, as illustrated in FIG. 10C, in the first prism assembly 166, a plurality of dielectric layers are film-formed on the first plane 51a of the first prism 51 and the second plane 54b of the fourth prism 54 to form the dielectric multilayer film 163 constituting the first dichroic mirror 161.

Next, the first prism assembly 166 on which the dielectric multilayer film 163 is formed and the second prism assembly 169 are joined together by intervening an organic-based adhesive.

Through these steps, the cross dichroic prism 150 according to the comparative example illustrated in FIG. 9 is completed.

In the cross dichroic prism 150 according to the comparative example, as illustrated in FIGS. 10A and 10C, all the layers of the dielectric layers in the dielectric multilayer films 163 and 164 constituting the respective dichroic mirrors 161 and 162 are formed only on one side of the two prisms that face each other. Thus, stress occurring in the dielectric multilayer films 163 and 164 acts only on one prism of the two prisms that face each other.

In the case of obtaining a dichroic mirror that satisfies a desired wavelength separating property that works for a specific linearly polarized light, in other words, works for either one of s-polarized light and p-polarized light, the number of layers of the dielectric layers constituting a dielectric multilayer film only needs to fall, for example, in approximately 30 layers to 40 layers. Thus, the stress occurring in the dielectric multilayer film has almost no adverse effect on a cross dichroic prism. However, in the case of obtaining a dichroic mirror that satisfies a desired wavelength separating property regardless of the polarization state of the incident light, the number of layers of the dielectric layers constituting a dielectric multilayer film needs to be, for example, approximately 100 layers, which are significantly great.

Based on calculation made by the present inventors, the stress occurring in a dielectric multilayer film constituted of dielectric layers of 100 layers results in the order of GPa, which is significantly large, although this depends on conditions such as the constituent material and the film thickness of the dielectric layer. In the cross dichroic prism 150 according to the comparative example, when the dielectric multilayer film has a great stress as described above, there is a possibility of breakage of the dielectric multilayer film 163 and 164 during the manufacturing process of the cross dichroic prism 150. Alternatively, even if the dielectric multilayer film 163 and 164 does not break, there is a problem of the occurrence of distortion of the prism 55. Furthermore, there is a problem of deterioration of display quality if a display device is manufactured using such a cross dichroic prism 150.

In response to such problems, in the case of the cross dichroic prism 50 according to the present exemplary embodiment, the two prisms 55 are separately formed in a manner such that dielectric layers of half (50 layers in the example of the present exemplary embodiment) of the number of layers of the dielectric multilayer films 63 and 64 constituting respective dichroic mirrors 61 and 62 face each other, as illustrated in FIGS. 3A and 3C. With this configuration, the stress in the dielectric multilayer film 63 and 64 occurring in the one prism 55 reduces as compared with the case of the cross dichroic prism 150 according to the comparative example. Based on calculation made by the present inventors, the stress occurring in the dielectric multilayer film including dielectric layers of 50 layers results in only the order of several hundreds of MPa. Thus, in the case of the cross dichroic prism 50 according to the present exemplary embodiment, it is possible to overcome problems such as breakage of a dielectric multilayer film and distortion of a prism.

Furthermore, in the case of the manufacturing process for the cross dichroic prism 50, the prism 55 on which the first dielectric multilayer film 631 and 641 are formed and the prism 55 on which the second dielectric multilayer film 632 and 642 are formed are adhered to each other by the adhesive layer 67 and 68 made of an organic-based adhesive. Thus, unlike a case where two prisms are joined together, for example, using a plasma polymerization method or the like, it is possible to use a simple manufacturing device, and hence it is possible to reduce the manufacturing cost. In addition, in terms of a property of the cross dichroic prism 50, in the case where the two prisms 55 are joined together using the adhesive layer 67 and 68, it is possible to reduce damage to the dielectric multilayer film due to plasma irradiation, as compared with a case where two prisms are joined together using a plasma polymerization or the like. Thus, it is possible to obtain an effect in which a desired optical property can be easily obtained.

Note that the dichroic mirror 61 according to the present exemplary embodiment employs a mode in which the thick adhesive layer 67 and 68 are inserted in the middle of dielectric layers of 100 layers constituting the dielectric multilayer film 63 and 64, and the entire dielectric multilayer film 63 and 64 is separated, by the adhesive layer 67 and 68, into two dielectric multilayer films each constituted of dielectric layers of 50 layers. The present inventors confirm that, even with the dichroic mirror having such mode, it is possible to obtain a wavelength separating property equivalent to a dichroic mirror having a configuration in which 100 layers of the dielectric layers are consecutively layered.

Second Exemplary Embodiment

Below, a second exemplary embodiment according to the present disclosure will be described with reference to FIG. 4.

The basic configuration of a cross dichroic prism according to the second exemplary embodiment is similar to that of the first exemplary embodiment, and the film thickness of an adhesive layer differs from that in the first exemplary embodiment. Thus, the entire description of the cross dichroic prism will not be repeated.

Figure 4:
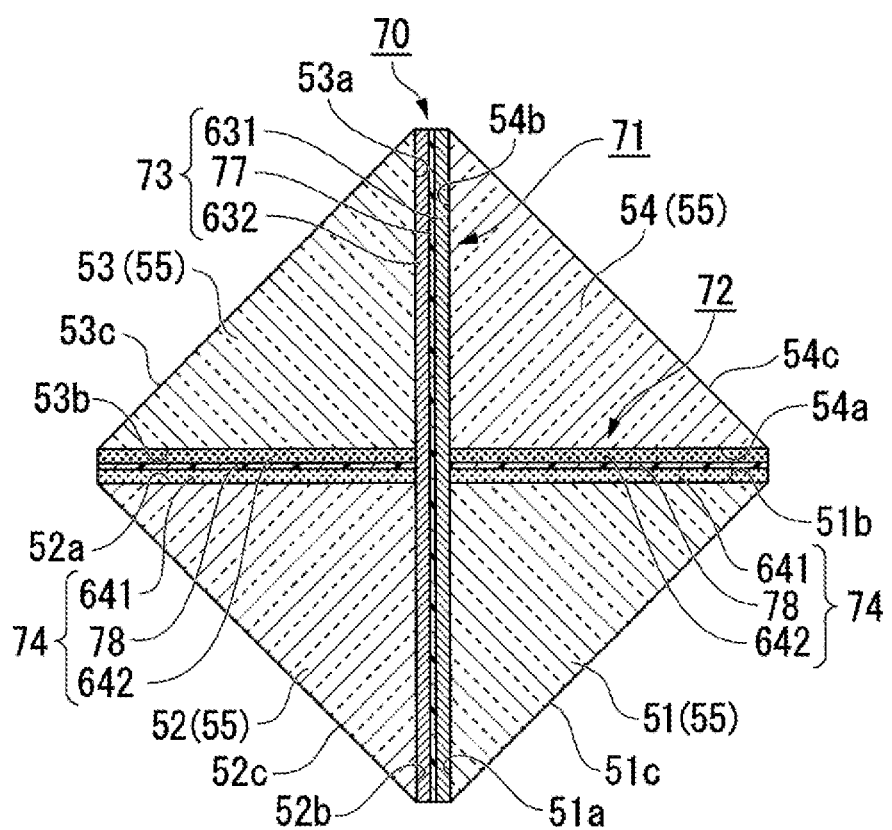
FIG. 4 is a cross-sectional view illustrating a cross dichroic prism according to a second exemplary embodiment.

FIG. 4 is a cross-sectional view illustrating a cross dichroic prism according to the second exemplary embodiment. As in FIG. 2, the drawing of FIG. 4 corresponds to a cross-sectional view at the line II-II in FIG. 1.

In FIG. 4, the constituent elements common to those in FIG. 2 are denoted with the same reference characters, and the description thereof will not be repeated.

As illustrated in FIG. 4, a cross dichroic prism 70 according to the second exemplary embodiment includes the four prisms 55 and two dichroic mirrors 71 and 72. A first dichroic mirror 71 is constituted of a dielectric multilayer film 73 provided between the first plane 51a of the first prism 51 and the second plane 52b of the second prism 52 and between the second plane 54b of the fourth prism 54 and the first plane 53a of the third prism 53. A second dichroic mirror 72 is constituted of a dielectric multilayer film 74 provided between the second plane 51b of the first prism 51 and the first plane 54a of the fourth prism 54 and between the first plane 52a of the second prism 52 and the second plane 53b of the third prism 53.

In the case of the first exemplary embodiment, the adhesive layer 67 and 68 have a film thickness greater than 1 µm. On the other hand, in the case of the second exemplary embodiment, the film thickness of the adhesive layer 77 and 78 is not less than 0.01 µm and not more than 1 µm. In other words, the film thickness of the adhesive layer 77 and 78 is equivalent to the film thickness of each dielectric layer of the dielectric multilayer film 73 and 74 constituting each of the dichroic mirrors 71 and 72. With this configuration, the adhesive layer 77 and 78 function as one layer of the dielectric layer constituting the dielectric multilayer film 73 and 74. The material of the adhesive layer 77 and 78 is similar to that in the first exemplary embodiment.

The other configurations and the manufacturing method for the cross dichroic prism 70 are similar to those in the first exemplary embodiment.

In the case of the second exemplary embodiment, it is possible to obtain an effect similar to the effect that can be obtained from the first exemplary embodiment, in which it is possible to provide the cross dichroic prism 70 that overcomes troubles such as breakage of a dielectric multilayer film and occurrence of distortion of a prism.

In particular, in the case of the second exemplary embodiment, the adhesive layer 77 and 78 function as one layer of the dielectric layer constituting the dielectric multilayer film 73 and 74, and hence the dielectric multilayer film 73 and 74 are configured to consecutively layer a plurality of dielectric layers, without the dielectric multilayer film 73 and 74 being divided into two dielectric multilayer films. This helps easily design the specifications of the dielectric layer at the time of creating the dichroic mirror 71 and 72 having a desired wavelength separating property.

Third Exemplary Embodiment

Below, a third exemplary embodiment according to the present disclosure will be described with reference to the drawings.

The cross dichroic prism described in the first exemplary embodiment and the second exemplary embodiment is used in a display device described below.

Figure 5:
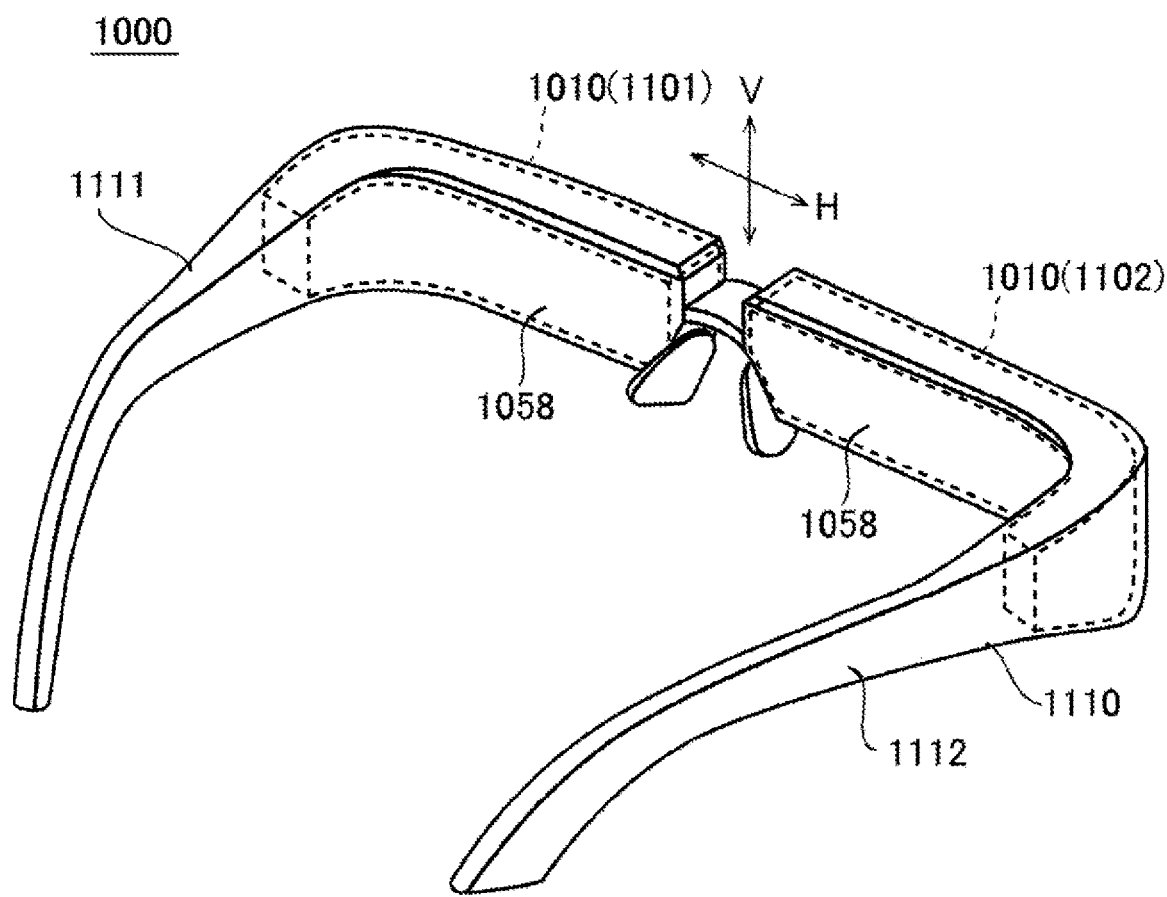
FIG. 5 is a schematic configuration view illustrating a head-mounted display device according to a third exemplary embodiment.
Figure 6:
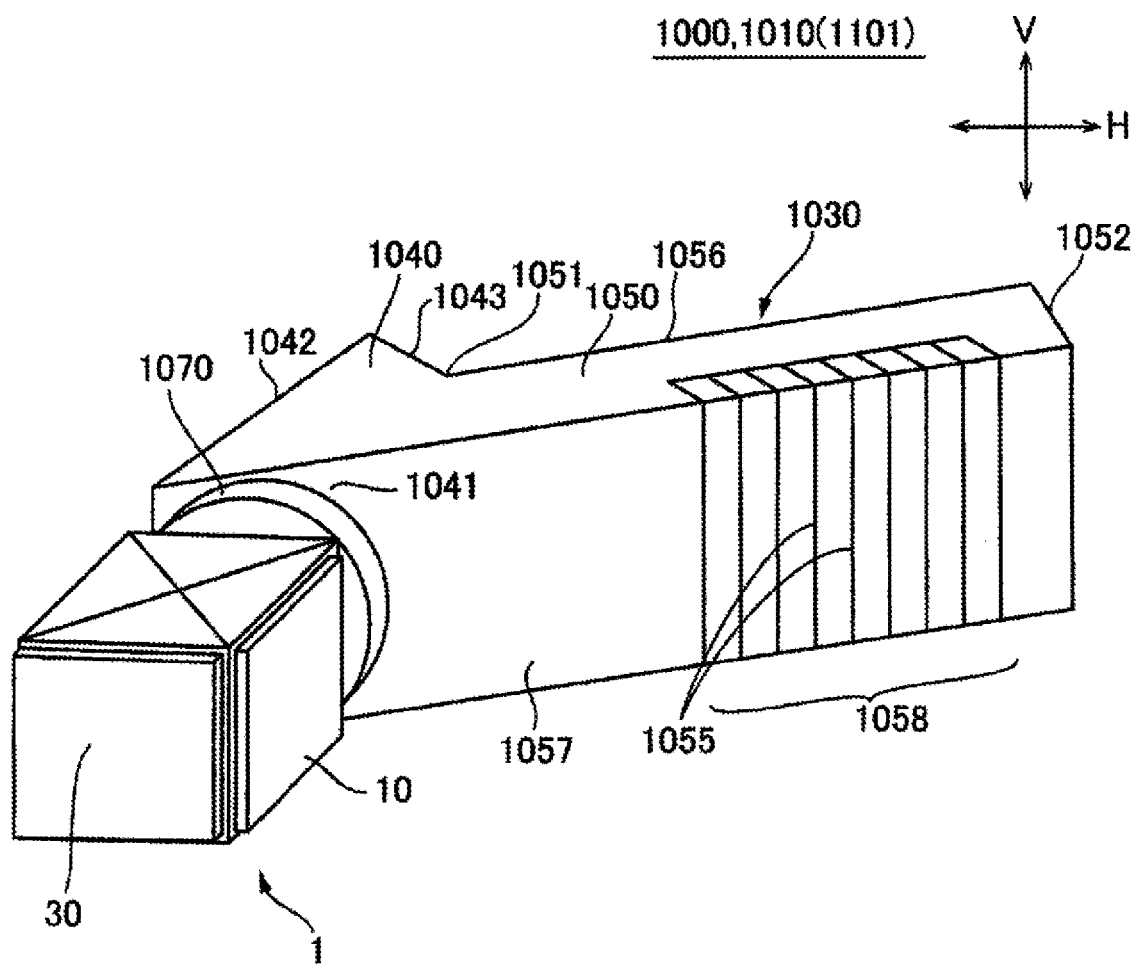
FIG. 6 is a perspective view schematically illustrating an optical system of a display unit illustrated in FIG. 5.
Figure 7:
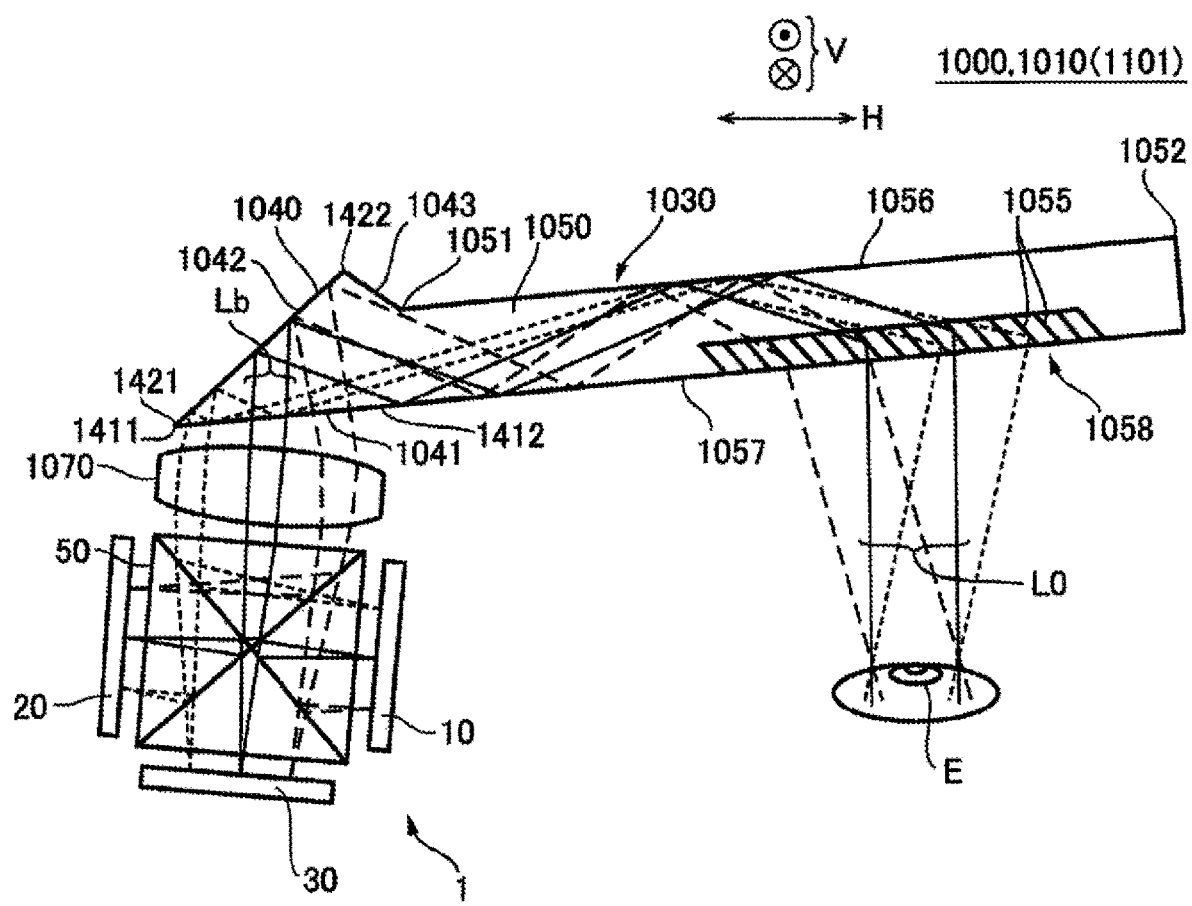
FIG. 7 is a diagram illustrating optical paths of the optical system illustrated in FIG. 6.

FIG. 5 is an explanatory diagram illustrating a head-mounted display device 1000 according to the third exemplary embodiment. FIG. 6 is a perspective view schematically illustrating a configuration of an optical system of virtual image display units 1010 illustrated in FIG. 5. FIG. 7 is an explanatory diagram illustrating optical paths of the optical system illustrated in FIG. 6.

As illustrated in FIG. 5, the head-mounted display device 1000 (image display device) is configured as a see-through type eyeglass display and includes a frame 1110 provided with left and right temples 1111 and 1112. In the head-mounted display device 1000, the virtual image display units 1010 are supported by the frame 1110, and an image emitted from the virtual image display units 1010 is caused to be recognized as a virtual image by a user. In the present exemplary embodiment, the head-mounted display device 1000 is provided with a left-eye display unit 1101 and a right-eye display unit 1102 as the virtual display units 1010. The left-eye display unit 1101 and the right-eye display unit 1102 have the same configuration and are disposed left-right symmetrically.

In the following description, the left-eye display unit 1101 will be mainly described, and the description of the right-eye display unit 1102 will be omitted.

As illustrated in FIGS. 6 and 7, in the head-mounted display device 1000, the left-eye display unit 1101 includes an image display module 1 and a light guiding system 1030 that guides synthesized light Lb emitted from the image display module 1 to an light exit portion 1058. A projection lens system 1070 is disposed between the image display module 1 and the light guiding system 1030, and the synthesized light Lb emitted from the image display module 1 enters the light guiding system 1030 via the projection lens system 1070. The projection lens system 1070 is configured by a single collimate lens that has a positive power.

The image display module 1 includes the cross dichroic prism 50, and three image display panels 10, 20 and 30 provided to face three surfaces of four surfaces (the third plane of the triangle-prism-shaped prism) of the cross dichroic prism 50. The image display panel 10, 20 and 30 are constituted of, for example, an organic EL panel.

Imaging light emitted from the first image display panel 10 enters the cross dichroic prism 50 as first imaging light LR in a first wavelength region. Imaging light emitted from the second image display panel 20 enters the cross dichroic prism 50 as second imaging light LB in a second wavelength region. Imaging light emitted from the third image display panel 30 enters the cross dichroic prism 50 as third imaging light LG in a third wavelength region. The synthesized light Lb in which the first imaging light LR, the second imaging light LB, and the third imaging light LG are synthesized is emitted from the cross dichroic prism 50.

In the present exemplary embodiment, the first wavelength region falls, for example, in 620 nm to 750 nm, and the first image display panel 10 emits the first imaging light LR with red color. The second wavelength region falls, for example, in 450 nm to 495 nm, and the second image display panel 20 emits the second imaging light LB with blue color. The third wavelength region falls, for example, in 495 nm to 570 nm, and the third image display panel 30 emits the third imaging light LG with green color. In the present exemplary embodiment, the first imaging light LR, the second imaging light LB, and the third imaging light LG are light that does not have polarization property.

The light guiding system 1030 includes a transmissive incidence portion 1040 from which the synthesized light Lb enters, and a transmissive light guiding portion 1050 having one end 1051 side coupled to the incidence portion 1040. In the present exemplary embodiment, the incidence portion 1040 and the light guiding portion 1050 are configured as an integrated transmissive member.

The incidence portion 1040 includes an incident surface 1041 from which the synthesized light Lb emitted from the image display module 1 enters, and a reflection surface 1042 that reflects the synthesized light Lb that has entered from the incident surface 1041, the synthesized light Lb being reflected between the reflection surface 1042 and the incident surface 1041. The incident surface 1041 is a flat surface, an aspherical surface, a free form surface, or the like and faces the image display module 1 via the projection lens system 1070. The projection lens system 1070 is disposed obliquely such that an interval between the projection lens system 1070 and an end portion 1412 of the incident surface 1041 is larger than an interval between the projection lens system 1070 and an end portion 1411 of the incident surface 1041. Although no reflection film is formed on the incident surface 1041, the incident surface 1041 fully reflects light that enters at an incident angle equal to or greater than a critical angle. Thus, the incident surface 1041 has a light transmissive property and a light reflecting property. The reflection surface 1042 is a surface that faces the incident surface 1041 and is disposed obliquely such that an end portion 1422 is located further away from the incident surface 1041 than an end portion 1421 of the incident surface 1041. Thus, the incidence portion 1040 has a substantially triangular shape. The reflection surface 1042 is a flat surface, an aspherical surface, a free form surface, or the like. The reflection surface 1042 has a configuration in which a reflective metal layer made, mainly, of aluminum, silver, magnesium, chrome, or the like is formed.

The light guiding portion 1050 includes a first plane 1056 (first reflection surface) that extends from the one end 1051 toward another end 1052 side, a second plane 1057 (second reflection surface) that faces the first plane 1056 in a parallel manner and extends from the one end 1051 side toward the other end 1052 side, and the light exit portion 1058 provided on a portion of the second plane 1057 that is apart from the incidence portion 1040. The first plane 1056 and the reflection surface 1042 of the incidence portion 1040 are joined together via a sloped surface 1043. The thickness of the first plane 1056 and the second plane 1057 is thinner than the incident portion 1040. The first plane 1056 and the second plane 1057 reflect all the light that is incident at an incident angle equal to or greater than the critical angle, based on a refractive index difference between the light guide portion 1050 and the outside (the air). Thus, no reflection film is formed on the first plane 1056 and the second plane 1057.

The light exit portion 1058 is configured on a portion of the light guiding portion 1050 on the second plane 1057 side in the thickness direction. In the light exit portion 1058, a plurality of partial reflection surfaces 1055 that are angled obliquely with respect to a normal line with respect to the second plane 1057 are arranged to be mutually parallel to each other. The light exit portion 1058 is a portion of the second plane 1057 that overlaps with the plurality of partial reflection surfaces 1055 and is a region that has a predetermined width in an extending direction of the light guiding portion 1050. Each of the plurality of partial reflection surfaces 1055 is constituted of a dielectric multilayer film. In addition, at least one of the plurality of partial reflection surfaces 1055 may be a composite layer including a dielectric multilayer film and a reflective metal layer (thin film) made mainly of aluminum, silver, magnesium, chrome, or the like. When the partial reflection surface 1055 is configured to include a metal layer, it is possible to obtain an effect of enhancing the reflectance of the partial reflection surface 1055 or to obtain an effect of optimizing the incident angle dependence or the polarization dependence of the transmittance and the reflectance of the partial reflection surface 1055. Note that the light exit portion 1058 may have a mode in which an optical element such as a diffraction grating and a hologram is provided.

In the head-mounted display device 1000 configured in this manner, the synthesized light Lb of the parallel light that enters from the incidence portion 1040 is refracted on the incident surface 1041 and travels toward the reflection surface 1042. Next, the synthesized light Lb is reflected on the reflection surface 1042 and travels toward the incident surface 1041 again. At this time, since the synthesized light Lb enters the incident surface 1041 at the incident angle equal to or greater than the critical angle, the synthesized light Lb is reflected on the incident surface 1041 toward the light guiding portion 1050 and travels toward the light guiding portion 1050. Note that the incidence portion 1040 is configured such that the synthesized light Lb that is the parallel light enters the incident surface 1041. However, it may be possible to employ a configuration in which the incident surface 1041 and the reflection surface 1042 are configured to have a free form curve or the like, and after the synthesized light Lb, which is non-parallel light, enters the incident surface 1041, the synthesized light Lb is reflected between the reflection surface 1042 and the incident surface 1041 to be converted into the parallel light while being reflected.

In the light guiding portion 1050, the synthesized light Lb is reflected between the first plane 1056 and the second plane 1057 and advances. Then, a part of the synthesized light Lb that enters the partial reflection surface 1055 is reflected on the partial reflection surface 1055 and is emitted from the light exit portion 1058 toward an eye E of an observer. Further, the rest of the synthesized light Lb incident on the partial reflection surface 1055 passes through the partial reflection surface 1055 and is incident on the next, adjacent, partial reflection surface 1055. Thus, the synthesized light Lb that is reflected on each of the plurality of partial reflection surfaces 1055 is emitted from the light exit portion 1058 toward the eye E of the observer. This enables the observer to recognize a virtual image.

At this time, as for the light entering the light guiding portion 1050 from the outside, this light passes through the partial reflection surfaces 1055 after entering the light guiding portion 1050 and reaches the eye E of the observer. This enables the observer to see the color image emitted from the image display module 1 and also see the scenery of the outside world and the like in a see through manner.

The head-mounted display device 1000 according to the third exemplary embodiment includes the cross dichroic prism 50 according to the first exemplary embodiment or the second exemplary embodiment and, hence, provides excellent display quality.

Fourth Exemplary Embodiment

Below, a fourth exemplary embodiment according to the present disclosure will be described with reference to FIG. 8.

The cross dichroic prism described in the first exemplary embodiment and the second exemplary embodiment is used in a display device described below.

Figure 8:
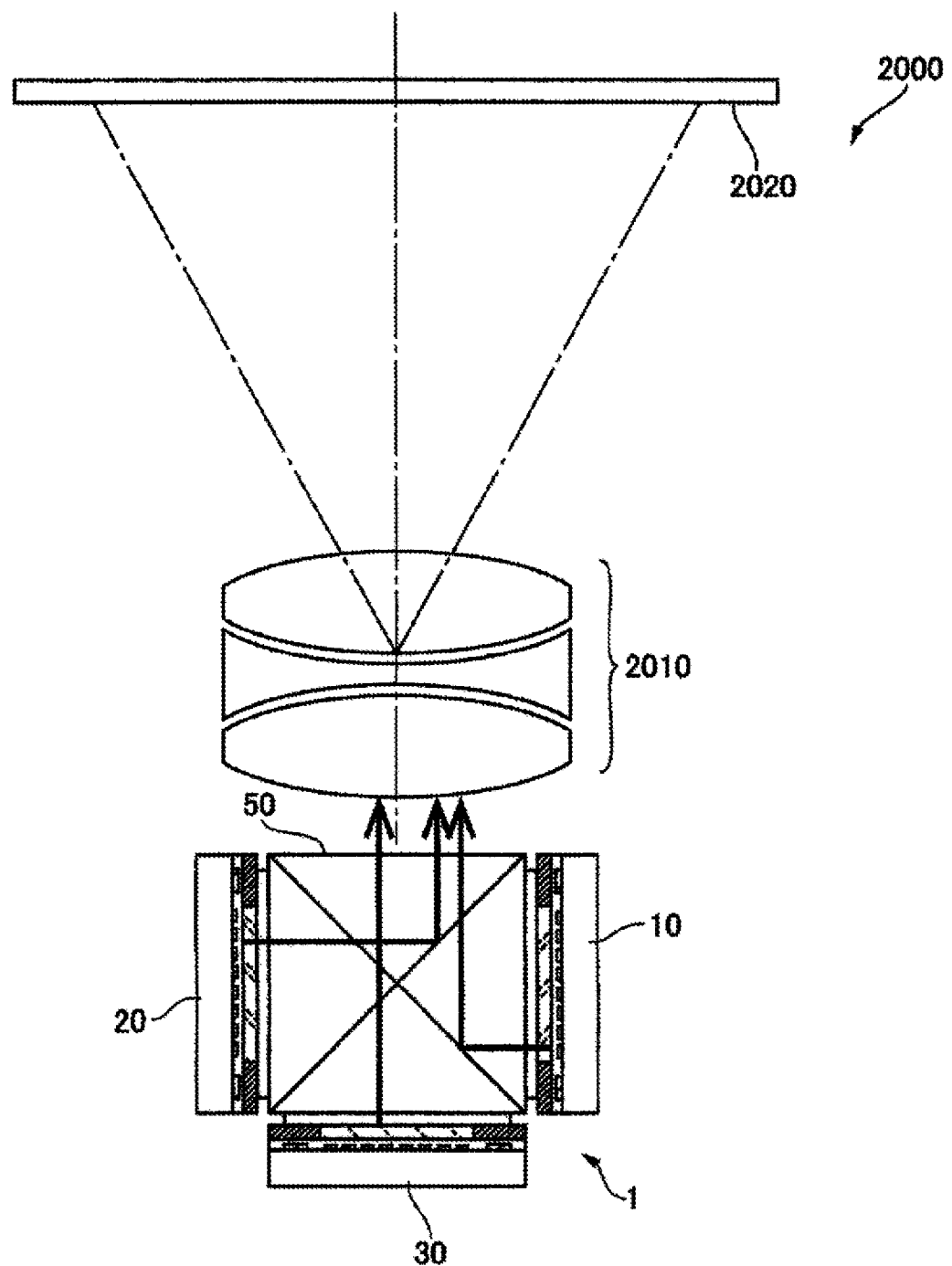
FIG. 8 is a schematic configuration view illustrating a projection-type display device according to a fourth exemplary embodiment.

FIG. 8 is a schematic configuration view illustrating a projection-type display device 2000 according to the fourth exemplary embodiment.

As illustrated in FIG. 8, the projection-type display device 2000 (image display device) includes the image display module 1 according to the above-described exemplary embodiments, and a projection optical system 2100 that expands the synthesized light Lb emitted from the image display module 1 and projects it onto a projection receiving member 2200 such as a screen.

The image display module 1 includes the cross dichroic prism 50, and the three image display panels 10, 20 and 30 provided to face three surfaces of four surfaces (the third plane of the triangle-prism-shaped prism) of the cross dichroic prism 50. The image display panel 10, 20 and 30 are constituted of, for example, an organic EL panel or other panel that emits imaging light that does not have polarization property.

The projection-type display device 2000 according to the fourth exemplary embodiment includes the cross dichroic prism 50 according to the first exemplary embodiment or the second exemplary embodiment and, hence, provides excellent display quality.

Note that the technical scope of the present disclosure is not limited to the above-described exemplary embodiments, and various modifications can be made to the above-described exemplary embodiments without departing from the spirit and gist of the present disclosure.

For example, it may be possible to change, as appropriate, the material, number, arrangement, shape, or other specific configurations of each constituent element of the cross dichroic prism, the image display module, and the image display device given as examples in the exemplary embodiments described above.

In addition, in the third exemplary embodiment and the fourth exemplary embodiment, the configuration obtained by combining the cross dichroic prism and the organic EL panel is given as an example of the image display module. However, the image display panel is not limited to the organic EL panel, and it may be possible to use an inorganic EL panel, micro LED panel, or other self-light-emission panel. Furthermore, instead of the self-light-emission panel that emits imaging light that does not have polarization property, it may be possible to use a liquid crystal panel or other image display panel that emits imaging light that has polarization property.

An example of the image display device including the image display module described in the above-described exemplary embodiments includes an electronic view finder (EVF) or the like used in an imaging device such as a video camera and a still camera.

The entire disclosure of Japanese Patent Application No.: 2018-126511, filed Jul. 3, 2018 is expressly incorporated by reference herein.

What is claimed is:

1. A cross dichroic prism comprising:
    four prisms; and
    two dichroic mirrors, wherein
    each of the four prisms has a triangle-prism shape and includes a first plane, a second plane, and a third plane, the first plane and the second plane intersecting each other to constitute a ridge line portion, the third plane forming an acute angle together with each of the first plane and the second plane,
    the four prisms are arranged in combination such that the ridge line portions of the four prisms face each other, the first plane of one prism of the four prisms faces the second plane of another prism of the four prisms, and the third plane faces outward,
    each of the two dichroic mirrors is constituted of a dielectric multilayer film provided between the first plane of the one prism and the second plane of the other prism, and
    an outermost dielectric layer constituting the dielectric multilayer film is provided in contact with each of the first plane of the one prism and the second plane of the other prism, wherein
    a first dielectric multilayer film, formed of a plurality of first dielectric layers constituting a part of the dielectric multilayer film, is provided on the first plane of the one prism,
    a second dielectric multilayer film, formed of a plurality of second dielectric layers constituting another part of the dielectric multilayer film, is provided on the second plane of the other prism, and
    an adhesive layer is provided between the first dielectric multilayer film and the second dielectric multilayer film.

2. The cross dichroic prism according to claim 1, wherein each of the two dichroic mirrors does not have a polarization-separation property.

3. The cross dichroic prism according to claim 1, wherein a film thickness of the adhesive layer is greater than 1 μm.

4. The cross dichroic prism according to claim 1, wherein the adhesive layer functions as a dielectric layer constituting the dielectric multilayer film.

5. The cross dichroic prism according to claim 4, wherein a film thickness of the adhesive layer is not less than 0.01 μm and not more than 1 μm.

6. The cross dichroic prism according to claim 1, wherein
    each of the plurality of dielectric layers is constituted of an inorganic film, and
    the adhesive layer is constituted of an organic film.

7. An image display module comprising:
    the cross dichroic prism according to claim 1; and
    at least two image display panels provided to face at least two of the third planes among four of the third planes of the cross dichroic prisms.

8. The image display module according to claim 7, wherein each of the at least two image display panels emits imaging light that does not have a polarization property.

9. An image display device comprising the image display module according to claim 8.

10. A cross dichroic prism comprising:
    a first prism;
    a second prism;
    a third prism; and
    a fourth prism, wherein
    the first prism has a first surface and a second surface,
    the first surface faces the second prism,
    the second surface faces the fourth prism,
    a first dielectric multilayer firm is provided on the first surface,
    the second prism has a third surface and a fourth surface,
    the third surface faces the first surface,
    the fourth surface faces the third prism,
    a second dielectric multilayer firm is provided on the third surface,
    the third prism has a fifth surface and a sixth surface,
    the fifth surface faces the fourth prism,
    the sixth surface faces the fourth surface,
    a third dielectric multilayer firm is provided on the fifth surface,
    the fourth prism has a seventh surface and a eighth surface,
    the seventh surface faces the fifth surface,
    the eighth surface faces the second surface,
    a fourth dielectric multilayer firm is provided on the seventh surface,
    a first adhesive layer is provided between the first dielectric multilayer firm and the second dielectric multilayer firm, a second adhesive layer is provided between the third dielectric multilayer firm and the fourth second dielectric multilayer firm,
a fifth dielectric multilayer firm is provided on the second surface and the fourth surface,
a sixth dielectric multilayer firm is provided on the sixth surface and the eighth surface, and
a third adhesive layer is provided between the fifth dielectric multilayer firm and the sixth second dielectric multilayer firm.

* * * * *